United States Patent [19]

Kreager et al.

[11] 4,373,982

[45] Feb. 15, 1983

[54] ULTRASONIC SEALING APPARATUS

[75] Inventors: William D. Kreager, Dallas, Tex.; Stanley I. Mason, Jr., Weston, Conn.

[73] Assignee: Frito-Lay, Inc., Dallas, Tex.

[21] Appl. No.: 209,979

[22] Filed: Nov. 24, 1980

[51] Int. Cl.³ .................. B29C 27/08; B29D 23/10
[52] U.S. Cl. .................... 156/359; 53/373;
156/203; 156/443; 156/580.1; 228/1 R; 425/174.2
[58] Field of Search .............. 156/73.1, 73.4, 203,
156/580.1, 580.2, 358, 443, 359; 228/1 R;
264/23; 425/174.2; 53/548, 371, 373

[56] References Cited

U.S. PATENT DOCUMENTS

| | | | |
|---|---|---|---|
| 2,660,219 | 11/1953 | Haas et al. | 156/203 |
| 3,294,616 | 12/1966 | Linsley et al. | 156/580.1 |
| 3,437,093 | 4/1969 | Williamson et al. | 228/1 |
| 3,556,912 | 1/1971 | Burgo et al. | 228/1 |
| 3,666,599 | 5/1972 | Obeda | 156/580.1 |
| 3,725,164 | 4/1973 | Albinger et al. | 156/73.4 |
| 3,925,139 | 12/1975 | Simmons | 156/358 |
| 3,952,937 | 4/1976 | Lamons et al. | 228/1 |
| 4,214,612 | 7/1980 | De Putter | 156/73.2 |

Primary Examiner—Michael G. Wityshyn
Attorney, Agent, or Firm—Bernard, Rothwell & Brown

[57] ABSTRACT

Plastic film in sheet form is supplied to a forming unit which forms it into tubular form with overlapping or fin-type edges. The edges are then caused to pass along an anvil and the horn of an ultrasonic sealing unit is positioned adjacent the edges for effecting ultrasonic sealing of the edges, the edges of the film passing through a gap between the horn and the anvil. An adjustable guide wheel is provided for ensuring that the edges are guided into proper relationship for ultrasonic sealing. The apparatus includes an adjustable rigid connection between the forming unit and the ultrasonic sealing apparatus for establishing a proper relationship between the forming unit and the ultrasonic unit and for providing the necessary rigidity. In order to ensure that the ultrasonic unit is effectively energized only when the film is moving therethrough, a tachometer or other speed-sensitive device responsive to movement of the sheet film is provided. A signal developed by this tachometer is transmitted to the ultrasonic sealing unit to ensure that the unit is effectively energized only when the film is moving through the sealing area and to control the level of energization of the ultrasonic unit in accordance with the speed of movement of the film. The horn is mounted on a support for adjustable movement toward and away from the anvil to vary the pressure exerted against the film edges. A transducer is mounted for movement into engagement with the support, the transducer being suitable for generating a signal indicative of the pressure exerted by the horn against the film edges.

10 Claims, 15 Drawing Figures

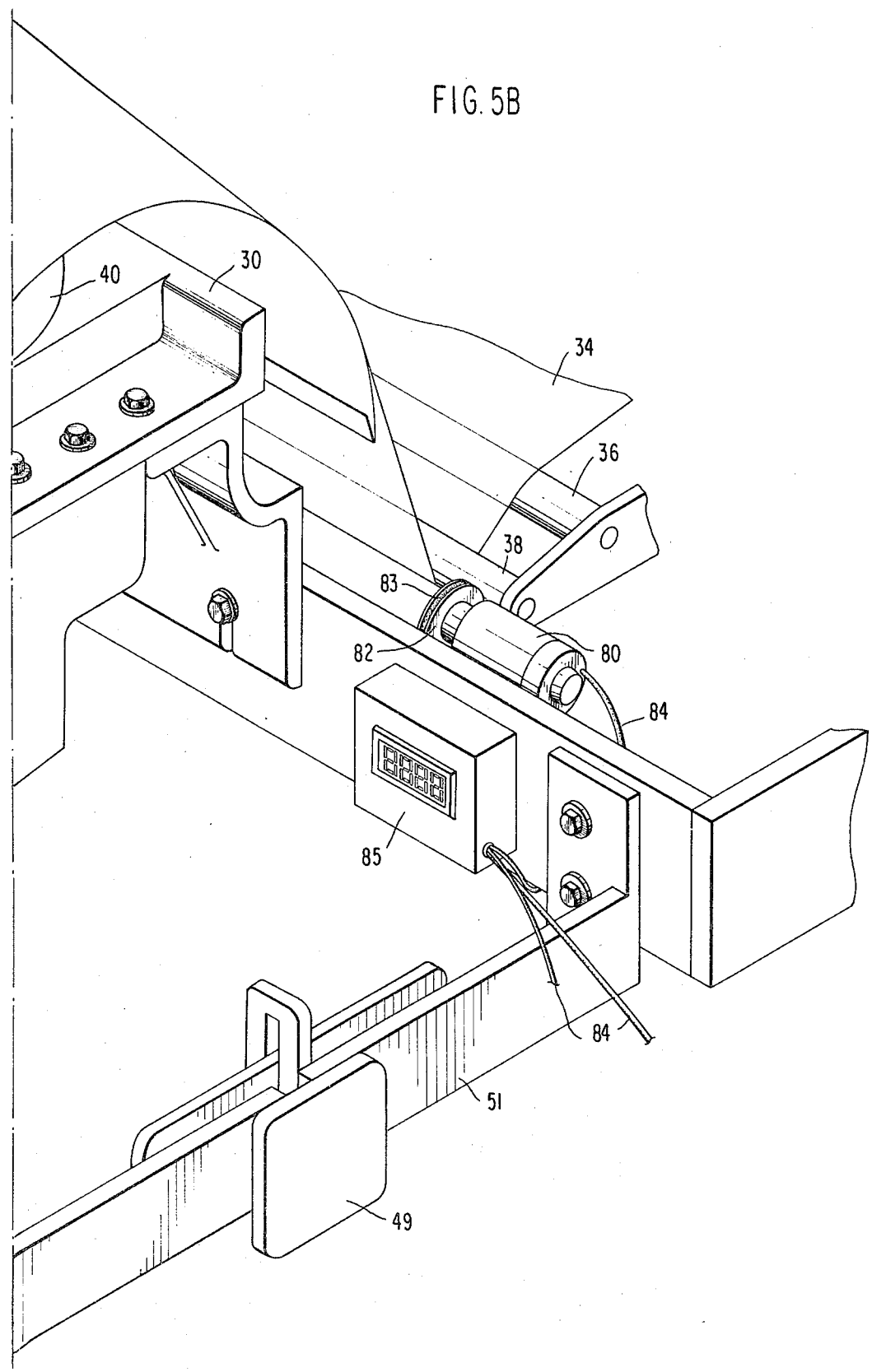

ULTRASONIC SEALING APPARATUS

BACKGROUND OF THE INVENTION

1. Field of the Invention

This invention relates to ultrasonic sealing apparatus and more particularly to ultrasonic sealing apparatus utilized in conjunction with bag-forming, -filling and -sealing apparatus.

2. Description of the Prior Art

In making film bags for packing potato chips and similar snacks, apparatus is frequently employed in which the film in sheet form is supplied with a continuous or intermittent motion to a forming apparatus which forms the sheet film into a tubular shape with either overlapping or fin-type edges. Glue or other adhesive is pre-applied to one edge of the film and the film, after being formed into the tubular shape, is passed through a sealing apparatus in which heat and pressure are applied to the edges to effect sealing thereof.

In one form of such apparatus, a transverse seal is made to close the top of one bag and form the bottom of the succeeding bag. A downward pull is applied to the transversely sealed area and the contacting edge of the tubular film is drawn along a device to heat-seal the edge of the next bag. The formed bag is severed, and the process is then repeated on a continuous basis by the apparatus.

This type of bag-forming and -sealing apparatus has some drawbacks. For example, it requires that adhesive be applied to at least one edge of the film. It has certain limitations as to speed of operation because it is necessary to provide time for the glue to liquefy and set in the sealing apparatus. It is subject to defective seals where there is a break in the line of adhesive, or where an inadequate amount of adhesive is applied, or where the adhesive is applied at an improper distance from the edge of the film. An irreducible minimum width of sealing surface is required to insure full sealing engagement of the adhesive under the variables of manufacturing conditions. Further, such apparatus is subject to problems because of the slip-dwell nature of the operation, these problems being particularly serious with longer bags where more than one dwell period is involved.

Ultrasonic apparatus has been used for bonding various plastic and other materials in a number of applications, and has been employed for forming transverse seals at the bottom and top of bags, but, insofar as the applicants are aware, it has not been employed up to this time for edge sealing in bag-forming, -sealing and -filling apparatus. There are particular problems involved with the use of ultrasonic apparatus in this type of application, particularly to avoid burning through the film rather than sealing and these problems are solved by the apparatus of the present application.

With the apparatus of this invention the need for adhesive is eliminated, a lesser width of fin-type or overlapping edges is required, more consistently satisfactory sealing is achieved, and greater speed of operation is achieved.

Accordingly, it is an object of this invention to provide, in connection with a bag-forming, -filling and -sealing apparatus, an ultrasonic apparatus for effecting the back sealing of a bag made from plastic film or plastic-coated paper or other sealable materials.

It is another object of this invention to provide an ultrasonic sealing apparatus which is coordinated with the bag-forming and -filling operation in a manner which ensures an effective ultrasonic seal.

SUMMARY OF THE INVENTION

In carrying out the invention, in one form thereof sealable sheet material, for example, plastic film, is supplied to a forming unit which forms it into tubular form with overlapping or fin-type edges. The edges are then caused to pass along an anvil and the horn of an ultrasonic sealing unit is positioned adjacent the edges for effecting ultrasonic sealing of the edges, the edges of the film passing through a gap between the horn and the anvil. An adjustable guide wheel is provided for ensuring that the edges are guided into proper relationship for ultrasonic sealing. The apparatus includes an adjustable rigid connection between the forming unit and the ultrasonic sealing apparatus for establishing a proper relationship between the forming unit and the ultrasonic unit and for providing the necessary rigidity. In order to ensure that the ultrasonic unit is effectively energized only when the film is moving therethrough, a tachometer or other speed-sensitive device responsive to movement of the sheet film is provided. A signal developed by this tachometer is transmitted to the ultrasonic sealing unit to ensure that the unit is effectively energized only when the film is moving through the sealing area and to control the level of energization of the ultrasonic unit in accordance with the speed of movement of the film. The horn is mounted on a support for adjustable movement toward and away from the anvil to vary the pressure exerted against the film edges. A transducer is mounted for movement into engagement with the support, the transducer being suitable for generating a signal indicative of the pressure exerted by the horn against the film edges.

DESCRIPTION OF THE DRAWINGS

FIGS. 5A and 5B together constitute a view similar to FIG. 5 but showing the components in enlarged form for illustrating further detail.

DESCRIPTION OF THE PREFERRED EMBODIMENTS

Figure 1:
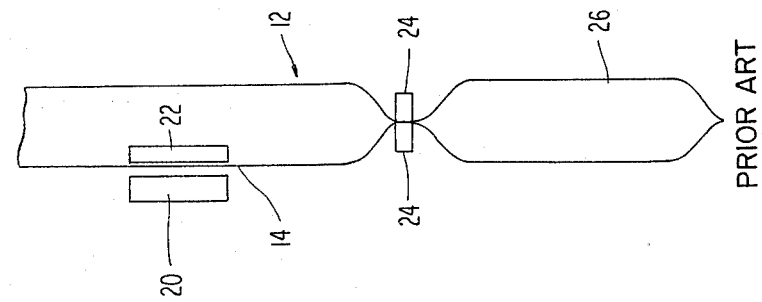

For a better understanding of the invention and the problems which it solves, it will be helpful to refer to FIGS. 1-4 which illustrate schematically the formation of film packages of the type here involved utilizing prior art apparatus. Sealable sheet material, for example, plastic film, is supplied from a roll and passed over a former (not shown) which places the film in the tubular shape illustrated at 12. In the form illustrated, the edges, generally indicated at 14 in FIG. 1, are in overlapping relationship. These edges are positioned between a back seal bar 20 and a back seal tongue 22. The back seal bar is pressed toward the tongue by a spring or by magnetic or hydraulic means to hold the overlapping edges in good sealing relationship. Heat is supplied to the back seal bar 20 to effect the sealing operation, for example, by causing a liquefaction and setting of the adhesive applied to one or both of the overlapping edges.

Heated dies 24 placed below the back seal bar and back seal tongue are provided for effecting a transverse seal under heat and pressure. This transverse seal simultaneously forms the sealed top of one bag and the sealed bottom of the successive bag 28. The dies 24 are then moved downwardly to the position shown in FIG. 2, causing the overlapping edges of the tubular structure 12 to be moved longitudinally through the space between the back seal bar 20 and the back seal tongue 22 to effect a seal therebetween. The product to be contained in the completed bag is dumped through the tubular structure to fill the bag.

Figure 4:
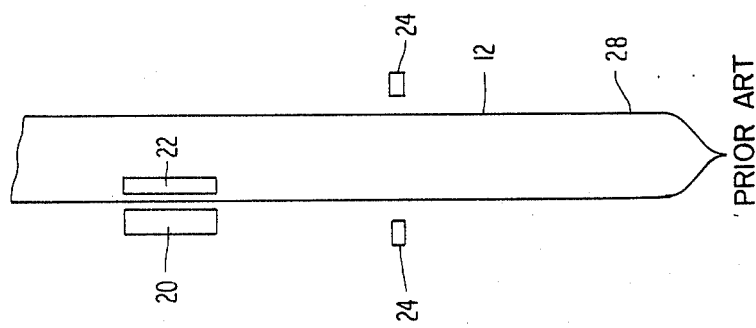
FIGS. 1, 2, 3 and 4 are schematic representations of the steps in sealing plastic film utilizing prior art apparatus.
Figure 3:
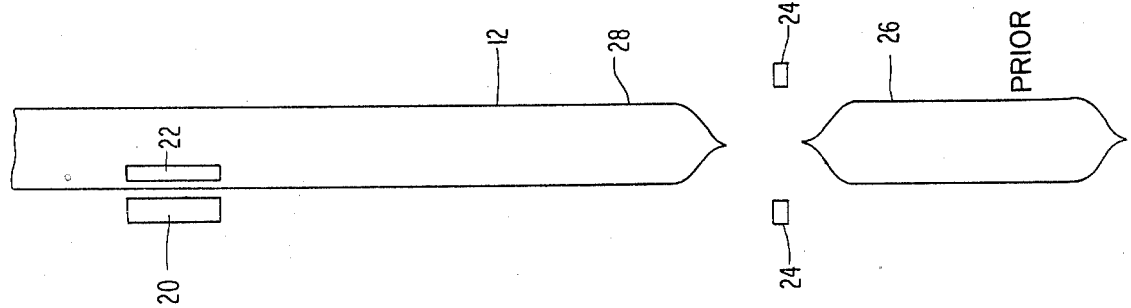
Figure 2:
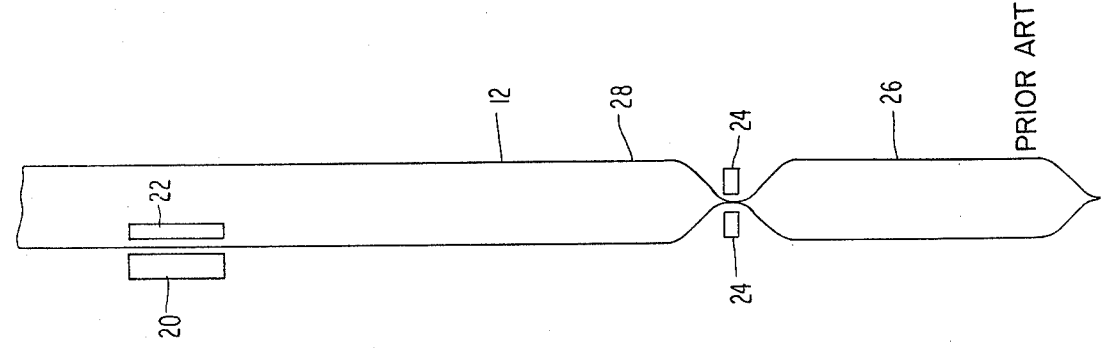

The completed bag 26 is severed as shown in FIG. 3 and the dies 24 are separated and moved upwardly to the position shown in FIG. 4. The dies are then brought together to effect another transverse seal forming the completed bag 28, and the process shown in FIGS. 1, 2, 3 and 4 is repeated.

Figure 5:
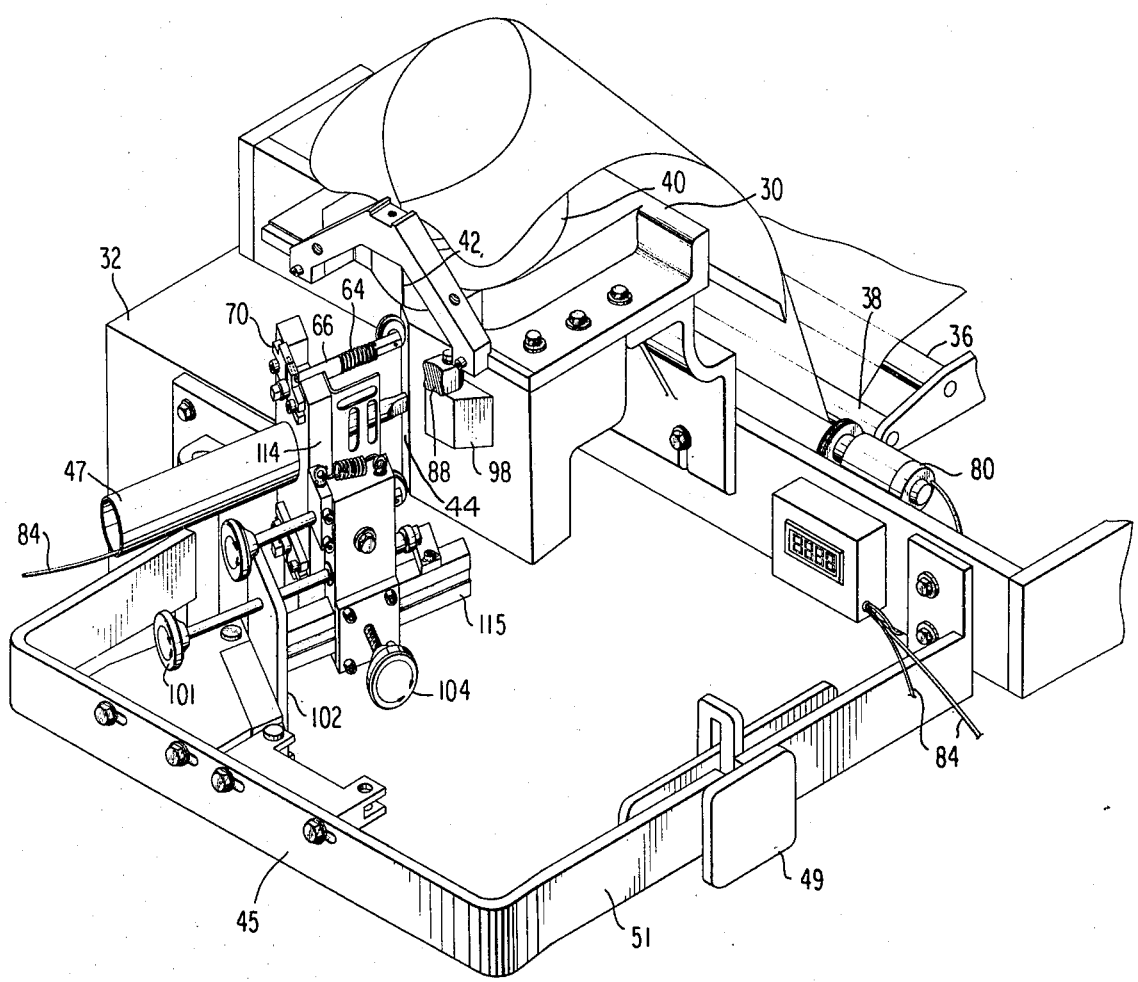
FIG. 5 is an isometric view of a bag-forming and -sealing apparatus constructed in accordance with this invention, partly broken away to illustrate components of the apparatus.
Figure 5A:
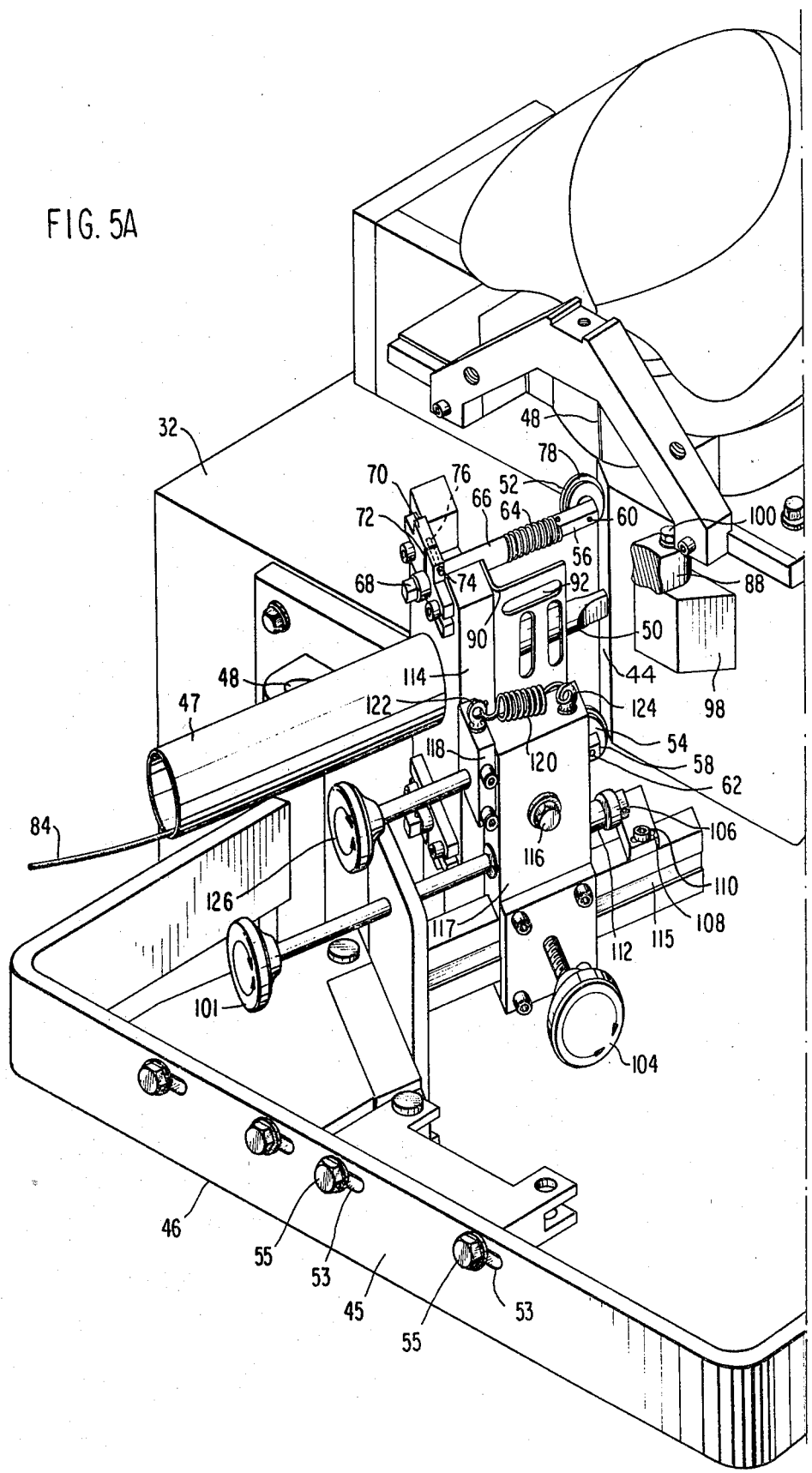
Figure 6:
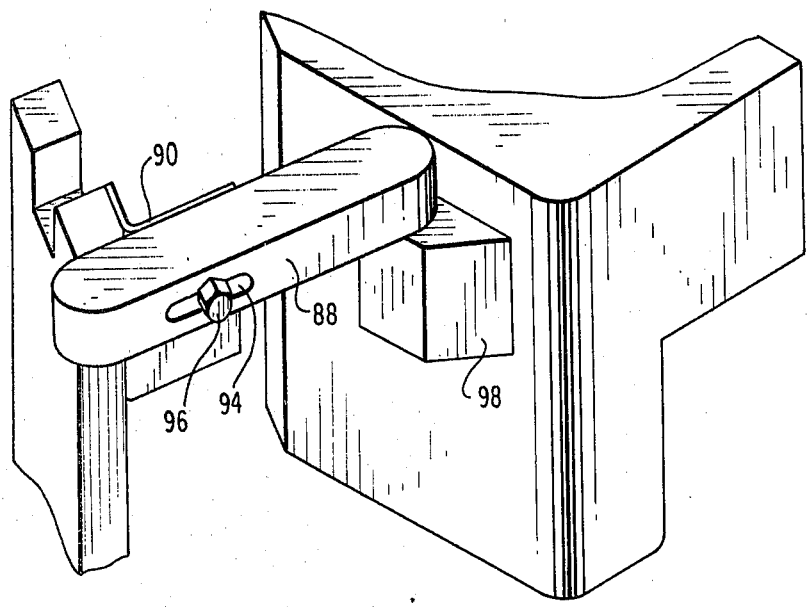
FIG. 6 is a view of a portion of the apparatus omitted in FIG. 5 for providing the necessary rigidity and position relationship between a forming unit and an ultrasonic sealing unit.

Referring now to FIG. 5, and also to the enlarged views shown in FIGS. 5A and 5B, which illustrate the apparatus of this invention as applied to forming a fin-type seal, there is shown a forming unit 30 and an ultrasonic sealing unit supporting structure 32 positioned adjacent the forming unit. The forming unit 30 has been illustrated only generally since a conventional bag-forming apparatus may be employed and the details of the forming unit are not part of the present invention. The forming unit illustrated in FIG. 5 is designed to form sealable sheet material, for example, plastic film into a tubular structure and to present contiguous edges of the film for sealing by the ultrasonic unit into a fin-type seal. Plastic film 34 is supplied in web or sheet form over rollers 36 and 38 to the forming structure 40 where it is shaped into tubular form with contiguous edges. The forming unit includes a vertical slit 42 through which the edges of the plastic film pass, forming the tubular bag. The forming unit includes an anvil 44 which, in the form shown, is a relatively heavy mass having a flat, vertical structure over which the edges to be sealed are moved. In the particular form shown in FIG. 5, the surface of the anvil 44 is positioned at approximately a 45° angle with respect to a wall 45 of a frame 46 to facilitate engagement by elements of the ultrasonic unit with the edges of the bag.

It is necessary from time to time to move the ultrasonic unit itself, indicated generally at 47, away from the forming unit to obtain access to the film area. For example, it may be necessary to feed film into the sealing area when a new roll of film is placed on the feeding apparatus or it may be necessary to introduce a different type of edge arrangement or a different anvil structure. In order to provide ready access for this purpose, the ultrasonic unit supporting structure 32 is supported on the frame 46 which is hinged at 48 so that the frame and the ultrasonic unit supported thereon may be swung away from the forming unit when desired. A clamp 49 is provided at the juncture of a frame 46 of the ultrasonic unit supporting structure with the frame 51 of the forming unit to hold these two frames and the ultrasonic unit and the forming unit in the desired relationship. The hinged frame 46 not only provides for convenient movement of the frame to obtain access to the film area adjacent the anvil when necessary, but it also provides a convenient means for effecting adjustment of the ultrasonic unit 47 relative to the forming unit. Thus, the frame 46 includes elongated openings 53 through which bolts 55 are inserted into threaded openings in the supporting structure of the ultrasonic unit. By this arrangement, the ultrasonic unit may be shifted laterally relative to the frame to alter the position of the sonic horn relative to the anvil as required.

The ultrasonic unit 47 includes a sonic horn 50 through which energy is provided for sealing the edges of the bag, the power supplied being at about 20,000 cycles per second, that is, at ultrasonic level. As shown, the sonic horn 50 is positioned closely adjacent the surface of the anvil 44 leaving a gap only sufficient for the edges of the bag to pass between the anvil surface and the sonic horn. As shown, the sonic horn 50 is formed with a relatively flat surface for engaging the material to be sealed, but it could be formed as a curved surface or provided with chamfered corners at the top and bottom to facilitate movement thereover of the material to be sealed. Alternatively, the sonic horn could be formed with a wheel for engaging the material to be sealed.

In order to press the edges of the plastic film together and to hold them in proper relationship for sealing purposes, two rotatably mounted guide wheels 52 and 54 are provided. The guide wheel 52 is positioned above the sonic horn 50 and the guide wheel 54 below that horn. The guide wheels 52 and 54 are supported on horizontal bars 56 and 58, respectively, being rotatably mounted thereon by means of pins 60 and 62, respectively, received in bores in the bars. Springs, one of which is shown at 64, are provided on the bars 56 and 58 for urging the guide wheels 52 and 54, respectively, toward the anvil 54 and against the edges of the film to be sealed.

The bar 56 is slidably supported within a sleeve 66. The sleeve 66 is formed internally with a longitudinal passage of square cross section, and the bar 56 has a square cross section corresponding to that of the passage through the sleeve 66 so that the bar may move longitudinally of the sleeve, but is held against rotation relative to the sleeve. A stop pin 68 on the bar 56 limits the movement of the bar under the bias of the spring 64, so that the bar 56 is retained in its assembled position when the sonic unit is swung away from the forming unit and the movement of the bar 56 is not limited by the anvil 44.

In order to ensure that the edges of the film forming the bag are positioned in proper relationship to one another, it may be necessary to position the guide wheel 52 at an angle to the vertical so as to urge the front edge of the film laterally one way or the other relative to the back edge of the film. To effect this angular shifting of the guide wheel 52, the sleeve 66 is mounted within a clamp 70 which is provided with an aperture for receiving the sleeve 66 and includes a slit 72 extending from the aperture to the edge of the clamp. A screw 74 is received in a threaded passage 76 in the clamp 70 for pressing the two legs of the clamp on opposite sides of the slit 72 toward each other to grip the sleeve 66 or for releasing the sleeve 66 when adjustment is to be made. Thus, if the two contiguous edges of the film are not moving in proper relationship to one another, the screw 74 is backed off to cause the clamp 70 to release the sleeve 66; the sleeve is then rotated in one direction or the other to a maximum of 45° in order to effect proper positioning of the two edges. After the guide wheel 52 has been properly positioned, the screw 74 is tightened to cause the clamp 70 to grip the sleeve 66 and hold the guide wheel in its adjusted position. For the purpose of guiding the edges more effectively and more effectively achieving the desired adjustment of the position of the edges when necessary, each of the guide wheels is provided with an O-ring 78 or other frictional guide about its circumference.

While portions of the mounting arrangement for the guide wheel 54 are hidden in FIG. 5, it will be understood that the structure described with respect to guide wheel 52 for supporting, adjusting and biasing that guide wheel is also provided for the guide wheel 54. However, in practice, it is contemplated that the guide wheel 54 will usually remain in its vertical position and not be adjusted to one side or the other of the vertical.

In utilizing ultrasonic sealing in connection with plastic film in the present apparatus, it is important that the sonic horn 50 be fully energized only when the film is moving downwardly through the gap between the anvil 44 and the sonic horn 50. The reason is that if the sonic horn were fully energized when the film is in a stationary position relative to the horn, it would provide too much energy in a concentrated area and tend to burn through the film rather than to seal the film. It will be understood from FIGS. 1 to 4 that in forming, sealing and filling bags of the type here involved, the longitudinal edges of the bag are stationary during the time the transverse seal is made and the severing operation is performed. It is important that the sonic unit not be fully energized during this period of operation of the apparatus. In accordance with the present invention, provision is made for ensuring that the ultrasonic unit and the sonic horn are substantially deenergized whenever the film is in a stationary position relative to the sonic horn, although to minimize surge when full power is applied to the sonic horn, a minimal power may be supplied to the sonic horn at all times. In carrying out this portion of the invention, a tachometer 80, or other rotatable apparatus for generating a voltage, is provided. The tachometer is mounted on the forming unit 30 and includes a wheel 82 in engagement with the roller 38 over which the plastic film 34 is delivered to the forming unit. The wheel 82 includes an O-ring 83 on its circumference for ensuring proper frictional engagement with the roller 38. In lieu of the O-ring 83 shown, a disc having a circumferential frictional element could be included as part of the wheel 82. Alternatively, the tachometer 80 could be geared to the roller 38 to insure a positive drive for the tachometer. This latter alternative arrangement has the further advantage of a speed relationship which is not affected by wear at the surface of an O-ring or other circumferentially engaging surface. The tachometer 80 generates a signal, that is, a voltage, representative of the movement of the wheel 82, and thus roughly proportional to the speed of movement of the film, and this signal is transmitted through a lead 84 to apparatus for controlling the energization of the ultrasonic unit 50a. It is also transmitted to a digital read-out 85 through lead 84 to indicate the speed of movement of the film. Thus, when the film in the gap between the anvil 44 and the sonic horn 50 is stationary, as it would be during the periods of operation shown in FIGS. 2, 3, and 4, the roller 38 and the wheel 82 are likewise stationary and substantially no signal is generated by the tachometer 80, although, to maintain minimal energy to the sonic horn as pointed out above, the apparatus may be arranged to have a minimal signal provided even when the film is stationary. Under these circumstances, the ultrasonic unit 47 remains substantially deenergized and only minimal energy is supplied to the sonic horn 50. When the film edges are moving downwardly through the gap between the anvil 44 and the sonic horn 50, corresponding to the movement from the position shown in FIG. 1 to that shown in FIG. 2, sheet film is moving over the roller 38 and the tachometer 80 develops a signal, approximately proportional to the speed of the film movement. This signal, transmitted to the ultrasonic unit, causes corresponding energization of the ultrasonic unit in an amount approximately proportional to the signal voltage and hence approximately proportional to the speed of movement of the film.

Figure 7:
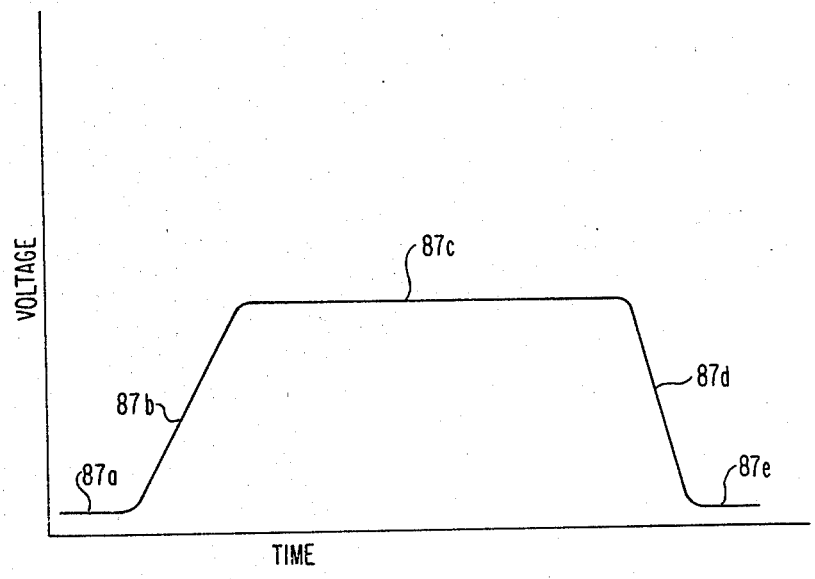
FIG. 7 is a graph showing the voltage developed by a tachometer relative to time during a cycle of the apparatus.

The relationship between the voltage developed by the tachometer during a cycle of operation of the apparatus is shown in FIG. 7. When the film is not being moved through the sealing area, that is, when the jaws 24 are moving from the position shown in FIG. 2 to that shown in FIG. 4, a minimal voltage, indicated at 87a is supplied from the tachometer to the sonic unit. As the jaws 24 move downwardly from the position shown in FIG. 1 to that shown in FIG. 2, moving the edges of the film through the sealing area, the voltage supplied from the tachometer to the sonic unit increases along a slope 87b as the speed of movement of jaws 24 and the film increases, the voltage rising to a maximum level indicated by the horizontal line 87c as the speed of the jaws and film reachs a maximum. Thereafter, as the jaws slow down and stop the voltage decreases along the slope 87d until it reaches the minimum level at 87e, which corresponds to the voltage at 87a. This voltage relationship over the time of a cycle of operation is, of course, repeated for successive cycles. The apparatus is arranged so that the level of energization of the sonic horn follows the voltage-time relationship shown in FIG. 7. Thus, at a point in the cycle of operation corresponding to 87a in FIG. 7, a minimal energization is provided to the sonic horn. As the film is moved through the sealing area, the energization of the sonic horn increases in a pattern corresponding to that shown in FIG. 7 to a maximum energization corresponding to the line 87c in FIG. 7. The minimal energization is provided at the sonic horn to minimize the surge which might occur upon energization of the sonic horn if the power to the sonic horn were cut off entirely during a portion of the cycle of operation. Such surge may cause burn-through of the film.

Apparatus has been illustrated and described above showing a tachometer for providing the control of voltage, and this is the preferred arrangement. Other arrangements may, however, be employed for measuring the speed and developing a control of voltage proportional to the speed. For example, lines could be printed on the film and a sensor provided for sensing the passage of successive lines and thereby developing a control voltage approximately proportional to the speed of the film.

In order to provide proper rigidity and thereby to avoid building up of harmonics and the dissipation of ultrasonic energy, an adjustable rigid bar 88 is provided between the forming unit 30 and the ultrasonic unit supporting structure 32. This bar 88 has been broken away in FIG. 5 and FIG. 5A to show other elements of the apparatus, but is shown in full in FIG. 6. Referring now to FIGS. 5, 5A, 5B and 6, an angle bracket 90 is provided on the ultrasonic unit supporting structure 32. The bracket 90 includes an elongated slot 92. The rigid bar 88 includes an elongated slot 94, and a bolt 96 extends through the slots 92 and 94 and engages a nut (not shown) for holding the bar 88 in proper engagement with the bracket 90. The elongated slots permit adjustment of the position of the bracket 90 relative to the bar 88 and therefore adjustment of the position of the ultrasonic unit supporting structure relative to the forming unit. The bar 88 is mounted on a support or mounting structure 98 on the forming unit 30 by means of a hinge 100. The provision of the rigid bar 88 and its firm connection in a desired position to the forming unit 30 and the ultrasonic unit supporting structure 32 ensures a rigid connection between the forming unit 30 and the ultrasonic unit 47 so as to minimize any building up of harmonics and dissipation of energy.

Figure 8:
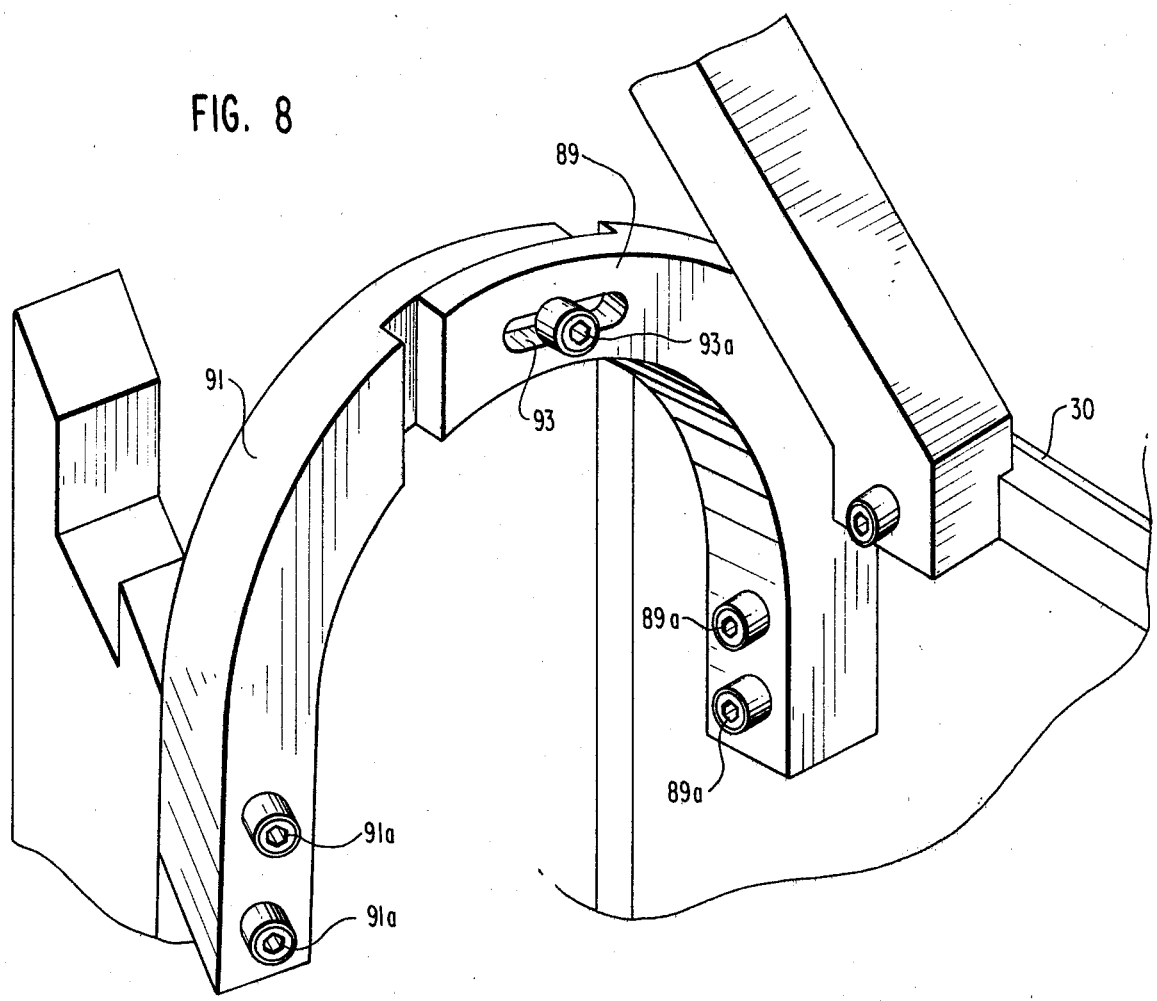
FIG. 8 is a view similar to FIG. 6 but including a different shape of the structure for providing a rigid connection between the forming unit and the ultrasonic sealing unit.

While a straight bar is shown in the embodiment illustrated in FIGS. 5, 5A, 5B and 6, and this is the form of the invention presently preferred, the necessary relationship and rigidity could be achieved by employing other shapes. For example, as shown in FIG. 8, the connection could be formed by two half-C elements 89 and 91. The element 89 is connected to the forming unit 30 by bolts 89a, and the element 91 is connected to the ultrasonic unit supporting structure 32 by bolts 91a. The element 89 is provided with an elongated slot 93 to provide for adjustment of the position of the ultrasonic unit 47 relative to the forming unit. A bolt 93a extends through the elongated slot 93 and an aperture (not shown) in the element 91. The bolt 93a and an engaging nut (not shown) provide for holding the elements 89 and 91 firmly and rigidly in the adjusted position. To further insure that the elements 89 and 91 remain in the adjusted position, the engaging faces may be serrated.

In order to provide for precise adjustment of the sonic horn 50 relative to the anvil 44 and the film edges passing therebetween, the ultrasonic unit supporting structure 32 includes a track 115 upon which a mounting structure 117 is slidably positioned. An adjusting knob 101 is screw-threadedly mounted on a vertical plate 102 for moving the mounting structure 117 back and forth along the track 115 to effect corresponding adjustment of the sonic horn 50 relative to the anvil 44. A knob 104, which includes a set screw engaging the track 115, is provided for holding the mounting structure 117 in the adjusted position. The knob 104 is turned in one direction for releasing the mounting structure 117 for adjustment and in the opposite direction for clamping the mounting structure firmly in its adjusted position.

It is desirable to have the sonic horn exert a predetermined pressure against the film during the sealing operation, the degree of pressure exerted against the film being more important in ultrasonic sealing than in conventional heat and pressure sealing. For this purpose a transducer 106 is adjustably mounted on the track 115. The transducer structure includes an elongated slot 108 in its base for permitting adjustment of the transducer relative to the track 115, and a bolt 110 for engaging a threaded recess in the track 115 is provided for holding the transducer in its adjusted position. The mounting structure 117 includes an element 112 aligned with the transducer 106 and adapted to engage the transducer.

In operation, the adjusting knob 101 is turned until the sonic horn 50 just engages the film to be sealed. The transducer 106 is then brought into engagement with the element 112, and the bolt 110 is tightened to hold the transducer in this position. The knob 101 is then further turned until the transducer indicates a predetermined pressure being exerted thereagainst by the element 112, this pressure corresponding to pressure exerted by the sonic horn 50 on the film. The transducer is connected to any conventional instrument for indicating the pressure exerted thereagainst. The operator, therefore, adjusts the knob 101 until the indicating instrument shows the desired reading. Thereafter, the knob 104 is moved to its clamping position. While a transducer provides a convenient means for indicating the proper pressure, other pressure-responsive devices could be used in lieu of the transducer.

In different types of sealing operations, the film may move at somewhat different angles, and in some cases this may result in too great a break over the anvil toward the jaws 24. The apparatus of this invention includes provision for adjusting the sonic horn to a corresponding angle so as to minimize the break of the film over the anvil. For this purpose, the structure 114 on which the sonic horn 50 is supported is pivotally mounted by means of a pivot pin 116 on the mounting structure 117. The supporting structure 114 includes a plate 118 extending adjacent a wall of the mounting structure 117. The plate 118 is biased against the wall of the mounting structure 117 by means of a spring 120 having one end connected to an eye 122 mounted on the plate 118 and the other end connected to a second eye 124 mounted on the mounting structure 117.

Adjustment of the angular position of the sonic horn is effected by means of an adjusting knob 126. This knob 126 includes a shaft screw-threadedly engaging the plate 118 and having its end positioned to engage the aforementioned wall of the mounting structure 117. Adjustment of the knob moves the plate 118 against the bias of the spring 120 to cause the support 114 and the sonic horn 50 to pivot about the pivot pin 116 to change the angular position of the sonic horn.

Figure 10:
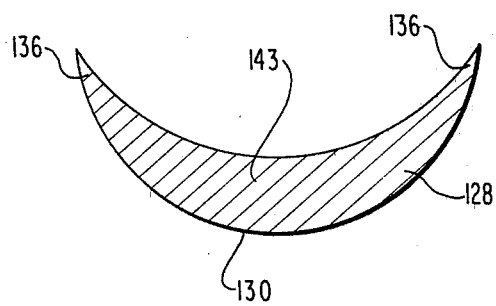
FIG. 10 is a sectional view taken along the line 10—10 in FIG. 9.
Figure 9:
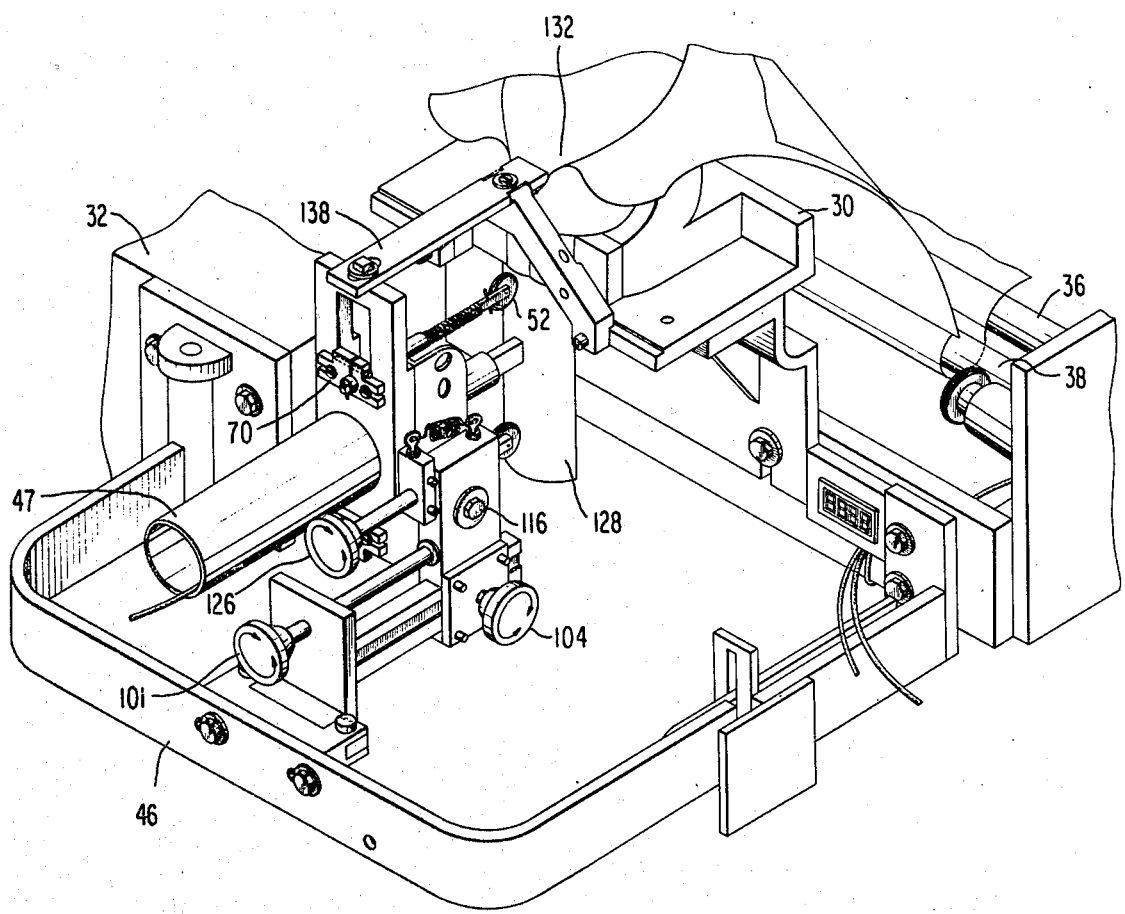
FIG. 9 is a view similar to FIG. 5 illustrating the application of the apparatus in forming a seal of overlapping edges.
Figure 9A:
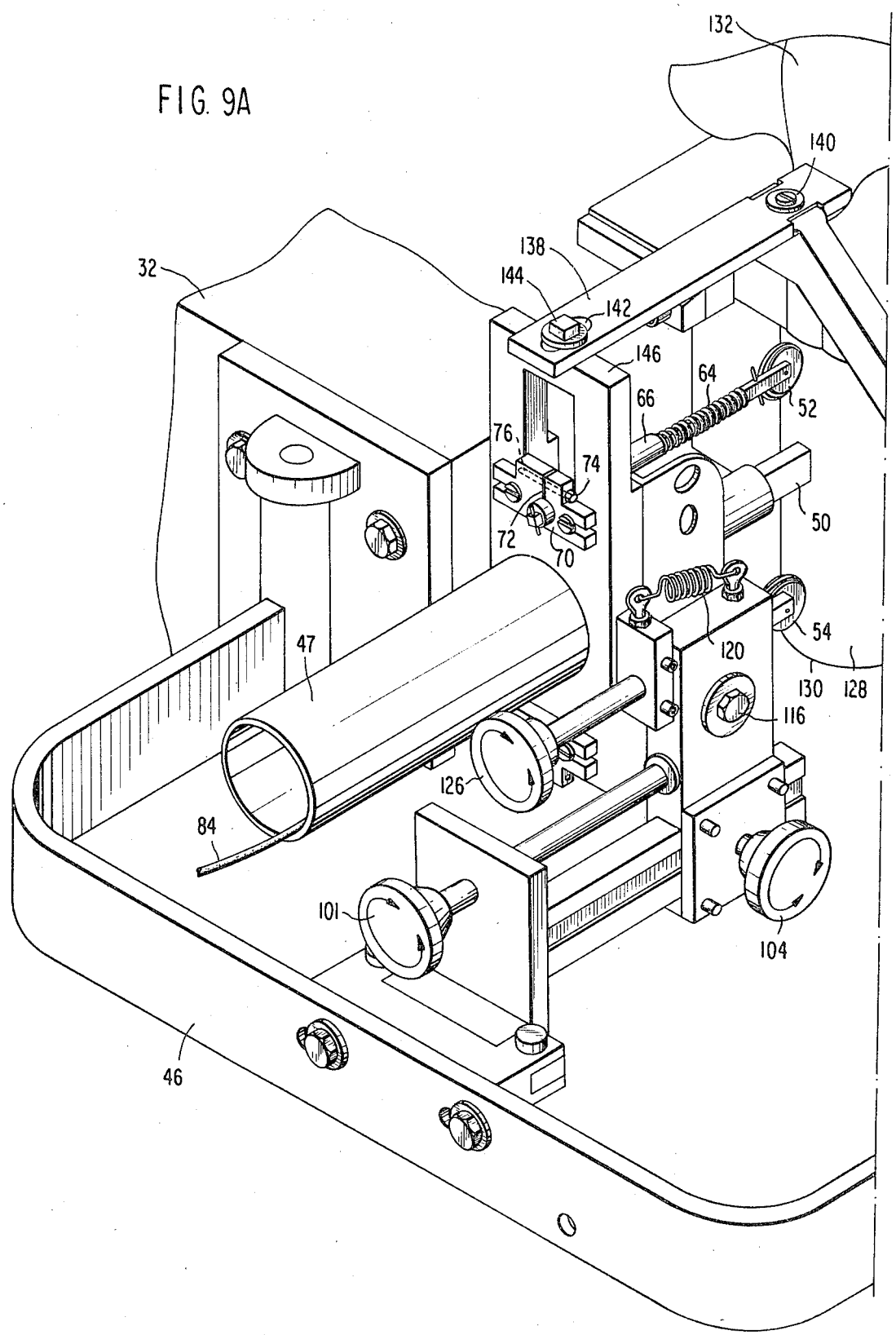
FIGS. 9A and 9B together constitute a view of the apparatus identical with that shown in FIG. 9 but on a larger scale to illustrate more clearly details of the apparatus.
Figure 9B:
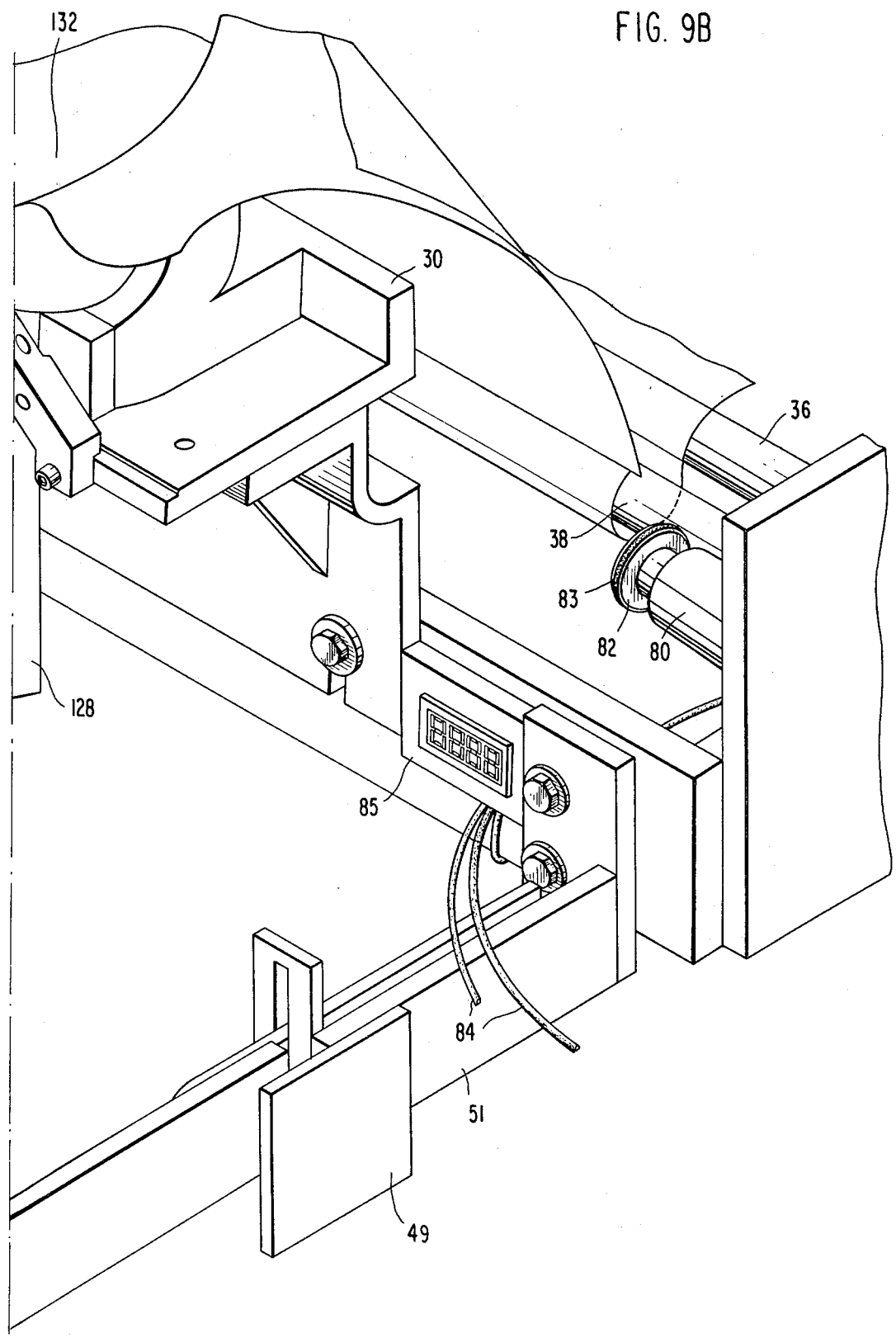

In FIGS. 9 and 10, there is shown a form of the apparatus of this invention which is suitable for sealing sheet film into bags having overlapping edges to be sealed rather than with the fin-type seal in the apparatus shown in FIG. 5. The same numerals have been applied to the same elements in FIGS. 5 and 9. The differences between the structures of the apparatus shown in FIGS. 5 and 9 reside in the anvil structure and in the positioning of the ultrasonic unit with respect to the anvil in order to accommodate the apparatus to the sealing of the bags having overlapping rather than fin-type edges.

In the structure shown in FIGS. 9 and 10, the ultrasonic unit supporting structure 32 is positioned in line with the forming unit 30 rather than at a 45° angle as in the apparatus shown in FIG. 5. The anvil 128 is preferably formed of a crescent-shaped cross section, as best shown in FIG. 10, the anvil having a curved surface 130 along which the overlapping edges of the film pass during the sealing operation. The sonic horn 50 is positioned adjacent the surface 130, a gap between the sonic horn 50 and the surface 130 being provided of sufficient clearance to permit passage of the overlapping film edges therebetween. In the normal operation of apparatus of this type, the bag is filled while in the position shown in FIG. 2, the material, such as potato chips or other products, being supplied through the central opening 132 in the forming unit. In order to provide minimum interference with the material passing through the opening 132 during the filling operation, and yet to provide adequate mass for effective ultrasonic sealing, the anvil 128 is made in a crescent shape as shown in FIG. 10. This provides adequate mass in the central area indicated at 143 in line with which the sonic horn 50 is positioned and adjacent which the overlapping edges of the film are positioned. At the same time, because of the tapered structure toward the edges at 136, there is a minimum of interference with the material passing by the anvil during the filling operation.

The structure shown in FIG. 9 also includes a somewhat different bar for providing the necessary rigidity between the forming unit and the ultrasonic unit supporting structure, and the bar is differently positioned. In the form shown in FIG. 9, a bar 138 is provided which is connected to the forming unit near the top thereof by a screw 140. The bar includes an elongated slot 142 for permitting adjustable positioning of the ultrasonic unit supporting structure relative to the forming unit. A bolt 144 extends through the elongated slot 142 and is received in a threaded aperture (not shown) in a portion 146 of the ultrasonic unit.

As in the case of the form of the apparatus illustrated in FIG. 5, a C-shaped rigid connection may be provided with the apparatus of FIG. 9 in lieu of the flat bar 138.

Figure 11:
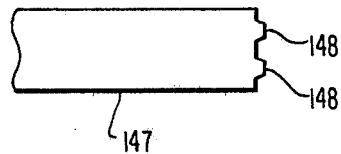
FIG. 11 is a top view of a portion of a modified form of sonic horn.

A modified form of the sonic horn is shown in FIG. 11. As there shown, the front face of the sonic horn 147 is formed to provide two spaced, parallel ridges 148. These parallel ridges engage the film along spaced parallel lines so that spaced seals are formed. By this arrangement, a better seal may be obtained even though the individual spaced seals are of somewhat lesser individual strength. The individual seals with this arrangement may be made of lesser melt depth so that the resultant product is more ductile and less susceptible to breakage. Further, if within the length of the back seal of an individual bag there should be a break in one of the seal lines, the other seal would still be effective to prevent leakage.

By the apparatus of this invention, a number of advantages are achieved. The adhesive-applying operation and the cost of the adhesive, which are required when apparatus using the adhesive and heat-sealing are employed, are eliminated. The overlap of the edges of the film is less than that required with the adhesive and heat-sealing approach, thereby achieving a saving of plastic film. More consistently satisfactory seals are achieved, thereby avoiding defective packages which are later discarded or returned. With the adhesive and heat-sealing approach, errors can occur in the applying of the adhesive. For example, there may be a break in the adhesive, or insufficient adhesive may be applied at some points along the plastic film, or the adhesive may be applied at an incorrect distance from the edge, all of these situations resulting in a defective seal. With the arrangement of this invention, which eliminates entirely the need for the adhesive, all of these problems are avoided. Also, the problems associated with the slip-dwell nature of conventional heat sealing apparatus are eliminated. Further, the biggest limitation on the overall speed of operation of apparatus for forming and sealing bags of the type here involved is the time required for the sealing operation, and ultrasonic sealing is faster.

While the invention has been described in connection with its use in connection with the sealing of bags used for packaging food items, such as potato chips and similar snacks, and this is its present use, it will be apparent that it could equally well be used for a variety of other items, for example, granular material, liquids, hardware items, etc.

It is claimed:
1. In an apparatus for forming, sealing and filling bags made of sealable sheet material,
   (a) a bag-forming unit;
   (b) means for supplying sheet material to said forming unit;
   (c) said forming unit being suitable for shaping said sheet material into tubular form with contiguous edges;
   (d) an anvil over which said edges can be moved;
   (e) an ultrasonic unit including a horn positioned in closely spaced relationship to said anvil;
   (f) means for moving said sheet material with the edges thereof disposed between said anvil and said horn; and
   (g) means responsive to movement of said sheet material for controlling the energization of said ultrasonic unit.

2. The apparatus of claim 1 and further including a guide wheel biased toward said anvil for engaging said edges of the film; and means for angularly adjusting said guide wheel relative to the direction of movement of the sheet material to position said edges in proper relationship.

3. The apparatus of claim 2 wherein:
   (a) said guide wheel is positioned on one side of said horn; and further including
   (b) a second guide wheel positioned on the other side of said horn for engaging said edges.

4. The apparatus of claim 1 having adjustable means engaging said forming unit and engaging supporting structure for said ultrasonic unit to position said ultrasonic unit relative to said forming unit in rigid relationship.

5. The apparatus of claim 1 wherein said responsive means transmits a signal to said ultrasonic unit to energize said ultrasonic unit approximately in proportion to the speed at which said edges are moved.

6. In an apparatus for forming, sealing and filling bags made of sealable sheet material,
   (a) a bag-forming unit;
   (b) means for supplying sheet material to said forming unit;
   (c) said forming unit being suitable for shaping said sheet material into tubular form with contiguous edges;
   (d) an anvil over which said edges can be moved;

(e) an ultrasonic unit including a horn positioned in closely spaced relationship to said anvil;

(f) means for moving said sheet material with the edges thereof disposed between said anvil and said horn;

(g) means responsive to movement of said sheet material for controlling the energization of said ultrasonic unit;

(h) said means for supplying sheet material including a roller over which said sheet material can be passed;

(i) said responsive means including a tachometer having a wheel engaging said roller; and (j) said tachometer being suitable for developing a signal to control energization of said ultrasonic unit.

7. The apparatus of claim 6 wherein:

(a) said tachometer includes means for developing a signal having a voltage approximately proportional to the speed of movement of said sheet material; and (b) said ultrasonic unit is energized to a level approximately proportional to said voltage.

8. In an apparatus for forming, sealing and filling bags made of sealable sheet material, (a) a bag-forming unit;

(b) means for supplying sheet material to said forming unit;

(c) said forming unit being suitable for shaping said sheet material into tubular form with contiguous edges;

(d) an anvil over which said edges can be moved;

(e) an ultrasonic unit including a horn positioned in closely spaced relationship to said anvil;

(f) means for moving said sheet material with the edges thereof disposed between said anvil and said horn;

(g) means responsive to movement of said sheet material for controlling the energization of said ultrasonic unit;

(h) adjustable means engaging said forming unit and engaging supporting structure for said ultrasonic unit to position said ultrasonic unit relative to said forming unit in rigid relationship;

(i) said adjustable means including a rigid bar member connected to said forming unit at one end and to said ultrasonic unit supporting structure at the other end;

(j) said ultrasonic unit supporting structure including a bracket member;

(k) at least one of said members including an elongated slot; and (l) a bolt received in said slot for adjustably connecting said bar to said bracket.

9. In an apparatus for forming, sealing and filling bags made of sealable sheet material, (a) a bag-forming unit;

(b) means for supplying sheet material to said forming unit;

(c) said forming unit being suitable for shaping said sheet material into tubular form with contiguous edges;

(d) an anvil over which said edges can be moved;

(e) an ultrasonic unit including a horn positioned in closely spaced relationship to said anvil;

(f) means for moving said sheet material with the edges thereof disposed between said anvil and said horn;

(g) means responsive to movement of said sheet material for controlling the energization of said ultrasonic unit;

(h) a support for said horn mounted for movement of said horn toward and away from said anvil;

(i) a pressure-responsive device mounted for movement into engagement with said support;

(j) means for adjusting said support to cause said horn to exert a predetermined pressure on said film; and (k) said pressure-responsive device being suitable for generating a signal during adjustment of said support to indicate the pressure exerted by said horn.

10. The apparatus of claim 9 wherein said pressure-responsive device is a transducer.

* * * * *